United States Patent [19]

Tsurumi et al.

[11] Patent Number: 4,985,386

[45] Date of Patent: Jan. 15, 1991

[54] CARBURIZED PLATINUM CATALYSTS AND PROCESS FOR PREPARING THE SAME EMPLOYING ACID AMINE SALTS

[75] Inventors: Kazunori Tsurumi, Tokyo; Toshihide Nakamura, Funabashi; Akira Sato, Misato, all of Japan

[73] Assignee: Tanaka Kikinzoku Kogyo K.K., Japan

[21] Appl. No.: 312,684

[22] Filed: Feb. 17, 1989

[30] Foreign Application Priority Data

Feb. 18, 1988 [JP] Japan .................. 63-36248

[51] Int. Cl.$^5$ .................. B01J 23/42; B01J 21/18; B01J 27/22; H01M 4/88
[52] U.S. Cl. .................. 502/185; 429/44; 502/101; 502/177
[58] Field of Search .................. 502/101, 177, 185; 429/44

[56] References Cited

U.S. PATENT DOCUMENTS

| | | | |
|---|---|---|---|
| 4,137,372 | 1/1979 | Jalan et al. | 502/101 |
| 4,137,373 | 1/1979 | Jalan et al. | 502/101 |
| 4,202,934 | 5/1980 | Jalan | 429/44 |
| 4,316,944 | 2/1982 | Landsman et al. | 429/44 |
| 4,447,506 | 5/1984 | Luczak et al. | 429/44 |
| 4,613,582 | 9/1986 | Luczak et al. | 502/185 |

*Primary Examiner*—Paul E. Konopka
*Attorney, Agent, or Firm*—Klauber & Jackson

[57] ABSTRACT

Disclosed herein are a platinum catalyst and a process for preparing the same. The catalyst comprises carbon supports and the carbides of (i) platinum and of (ii) one or more metals selected from the group consisting of nickel, cobalt, chromium and iron, and if necessary of (iii) manganese, supported on the carbon supports. The catalyst possesses superior catalyst performance because the catalyst metals are firmly fixed to the carbon supports by means of the carburizing.

The process for preparing the platinum catalyst includes alloying the metals by employing their organic acid amine salts. This alloying requires a lower temperature than that in a conventional process so that the movement of the metals which leads to agglomeration thereof can be advantageously prevented.

8 Claims, No Drawings

CARBURIZED PLATINUM CATALYSTS AND PROCESS FOR PREPARING THE SAME EMPLOYING ACID AMINE SALTS

BACKGROUND OF THE INVENTION

This invention relates to a catalyst comprising carbon supports supported with carburized platinum and other metals, especially a platinum catalyst employed for the electrode catalyst of a fuel cell and a process for preparing the same.

Catalysts comprising carbon supports and various catalyst metals, mainly a platinum metal supported thereon have heretofore been employed as those for various chemical reactions and for the electrodes of fuel cells. A number of other catalysts which contain the other metals such as nickel and chromium in addition to the platinum have been known for promoting the catalyst performance.

The catalyst performance of these catalysts depends on the degree of dispersion these metals and the performance is promoted with the increase of the surface area of the catalyst. If the same amount of the catalyst is supported thereon. Temperatures at hitch the above catalysts are employed in the fuel cells and in the various chemical reactions are between 80° and 210° C. for the former and they may often exceed 210° C. for the latter depending on the reaction. In such high temperatures the absorbing force between the support and the catalyst particles supported thereon is weakened so that the catalyst particles may move on the surface of the supports to agglomerate with each other. The agglomeration results in the decrease of the surface area, which brings about the decrease of the catalyst performance, to produce the drawback of the lowering of the cell voltage at a certain current density or the shortening of the catalyst life.

Various kinds of catalysts have been proposed as improvements of the above conventional catalysts. However, most of these catalysts attach importance to the catalytic activity itself and pay little attention to the extension of the catalyst life. In the U.S. Pat. No. 4,202,934 is described a catalyst which has been made by alloying platinum with vanadium for promoting the catalytic performance, which is reported to lose 67.5 weight % of the vanadium in 48 hours from the beginning when employed as the cathode of a hot phosphoric acid type fuel cell (U.S. Pat. No. 4,316,944). As the improvement of the above catalysts use of chromium has been proposed as an alloy component. Also in this case. 37.5 weight % of the chromium is reported to dissolve out in 48 hours from the beginning when employed as the cathode of a fuel cell.

Further the U.S. Pat. No. 4,447,506 is described the addition of cobalt to a platinum-chromium alloy for improving the activity for reduction of oxygen in a hot phosphoric acid type fuel cell. However, no description about the life of the electrode catalyst under the operating conditions is included therein.

As to the problem of the surface area decrease of the platinum catalysts a method for depressing the surface area decrease by attaching carbon around the platinum by means of heat treatment of the catalyst in carbon monoxide has been proposed (U.S. Pat. No. 4,137,372). Also by this treatment, the surface area of the catalyst is shown to decrease to about half of the original value 100 hours from the beginning when employed as the cathode of a fuel cell.

SUMMARY OF THE INVENTION

Accordingly, it is an object of this invention to provide a catalyst having the same activity as that mentioned above and containing mainly platinum of which catalyst performance can be maintained satisfactorily for a long lime, and a process for preparing the same. In accordance with one aspect of this invention, there is provided a platinum catalyst comprising carbon supports and the carbides of (i) platinum and of (ii) one or more metals selected from the group consisting of nickel, cobalt, chromium and iron, supported on the carbon supports.

In accordance with another aspect of this invention, there is provided a platinum catalyst comprising carbon supports and the carbides of (i) platinum and of (ii) one or more metals selected from the group consisting of nickel, cobalt, chromium and iron and of (iii) manganese, supported on the carbon supports.

In accordance with further aspect of this invention, there is provided a process for preparing the above first catalyst comprising immersing carbon supports into a solution containing a platinum containing ion, reducing the platinum containing ion to platinum by a reducing agent to be deposited onto the carbon supports, adding a solution containing the organic acid amine salt or salts of one or more metals selected from the group consisting of nickel cobalt, chromium and iron, to the carbon supports alloying the and then carburizing these metals.

In accordance with still further aspect of this invention, there is provided a process for preparing the above second catalyst comprising the steps of the above process which further contains the organic acid amine salt of manganese in the said solution.

The most characteristic feature of this invention is in that the catalyst metals including platinum are carburized to increase the adhesion between the metals and the carbon of the carbon supports so that the catalyst metals do not move on the surface of the carbon supports to agglomerate with each other to decrease the surface area even if the catalyst is exposed to high temperatures for a long period of time.

DETAILED DESCRIPTION OF THE INVENTION

Carbon is employed as catalyst supports in the present invention. The carbon includes a simple substance having any form of which a main component is carbon such as carbon black, graphite and activated carbon. Preferably, the carbon supports are porous and have a large surface area, for instance. 30 to 2000 m$^2$g, and have a article size of 100 to 5000 Å. Such carbon as Shawinigan Acetylene Black (trade name), electroconductive carbon black (trade name Vulcan XC-72R) and graphitized carbon black may be employed.

In the process of this invention, a platinum metal is initially made to be supported onto the carbon supports. The supporting of the platinum metal can be carried out according to any conventional method. One of the conventional methods comprises impregnating the solution of a platinum containing ion, for example, an aqueous solution of chloroplatinic acid into the carbon supports, reducing the platinum containing ion and depositing the reduced platinum metal onto the carbon supports; and another comprises, prior to the impregnation into the carbon supports, reducing the chloroplatinic acid and depositing the reduced platinum onto the carbon supports. If, however, a strong reducing agent is employed in these reactions for reduction, the size of platinum particles creases so that the surface area of the particles per unit weight considerably decreases. For this reason, such a weak reducing agent as sodium thiosulfate ($Na_2S_2O_3.5H_2O$) and potassium thiosulfate is preferably employed to depress the decrease of the surface area of the platinum. The said sodium and potassium thiosulfates reactt with the platinum containing ion, that is, the chloroplatinic ion to for finely divided metal sol having a large surface area.

It seems that, in this reaction employing the sodium thiosulfate, much finely divided sulfur sol may be formed by decomposition of a sulfur compound according to the following equation, which is known to occur in an acidic solution.

$$S^{2-} + 2H^+ \rightarrow H_2S_2O_3 \rightarrow S + H_2SO_3$$

The sulfur particles thus obtained serve as nuclei for growing much finely divided metal catalyst particles. Accordingly, it is preferable to slowly add, that is, add dropwise the initial several milli liters of the solution of the sodium thiosulfate and then add the rest of the solution all at once for assuredly forming the nuclei for growing.

With the progress of the reaction, the solution turns from yellow to orange, and with the further growth of the metal crystals for several hours, the solution gradually becomes darker. Light passing through the solution exhibits the Tyndall effect showing the existence of colloidal particles.

This sol is then adsorbed onto the carbon supports to provide the carbon supports supported with the platinum through appropriate procedures such as drying.

In other words, when the said solution becomes nearly opaque, the carbon supports are added into the solution and then the liquid phase of the formed slurry is forced to penetrate into the pores of the carbon supports by means of agitation employing for example a supersonic ave agitator. The thicker slurry is formed by this procedure, which remains suspended and seldom precipitates. Drying of this slurry e.g. at 75°–80° C. for 1–3 days for removing water provides dried powders containing the salt of a reaction byproduct. The byproduct may be dissolved and removed by extracting the dried powders several times with for instance 100–200 ml of distilled water. In the case of the graphitized carbon black supports, the said slurry precipitates can be separated from the aqueous phase by discharging the aqueous phase. After the procedure is repeated several times, the catalyst is dried overnight at about 110° C. The catalyst thus obtained has a large surface area.

For example, according to the process an aqueous solution of 1 g/100 ml of chloroplatinic acid is reacted with an aqueous solution of 1 g/25 ml of sodium thiosulfate (penta hydrate salt) to produce a catalyst supported with platinum having the uniform particle size of which a specific surface area is 148 m²/g.

In place of the above procedure, slurrying-filtraton-washing process can be utilized. This process can be used in case of acetylene black or the like which does not easily precipitate.

Since the thermodynamic driving force of the reaction between the chloroplatinic ion and the thiosulfate ion is smaller than that of the conventional art and fine crystal particles with lesser defects can be produced, the catalyst particles produced in this process is considered to have larger durability against a sintering reaction in which the surface area of platinum decreases with time. The fine particles having a uniform particle size not more than 20 Å can be obtained by the above mentioned reaction between the thiosulfate and the chloroplatinic acid.

The relatively weak reducing agents which may be employed in the present invention includes sodium metabisulfite ($Na_2S_2O_5$) and the like other than the above described sodium thiosulfate.

Although the process for reducing the platinum prior to the impregnation of the platinum containing solution into the carbon supports has been described in detail, the platinum containing ion, contrary to the above process, may be reduced after the impregnation and thereby the high dispersion of the catalyst particles can be also obtained.

Then, other metals than platinum which are selected from the group consisting of nickel, cobalt, chromium and iron; or consisting of these metals and manganese are supported onto the carbon supports having been supported with the platinum.

Concrete combinations preferably include platinum-nickel, platinum-cobalt. platinum-chromium, platinum-iron, platinum-nickel-cobalt, platinum-chromium-cobalt, platinum-chromium-nickel, platinum-iron-cobalt, platinum-iron-nickel, platinum-iron-chromium, platinum-iron-manganese, platinum-nickel-manganese and the like, and other combinations can be selected from these consisting of platinum-nickel-cobalt-chromium, platinum-cobalt-chromium-iron, platinum-nickel-cobalt-chromium-iron and the like.

Although it is preferable to alloy the platinum with the other metals by heating, it is not preferable to employ an ordinary alloying method for alloying the because the produced alloy agglomerates to decrease the surface area at a high temperature. For this reason, in the process of this invention, ammonium hydroxide or the like is initially added to the warm aqueous solution of an organic acid salt preferably a formate or an acetate of such metals to be added to the platinum as nickel cobalt and the like to convert the acid salt into the corresponding metal of the organic acid amine preferably the metal salts of formic acid amine or acetic acid amine.

When an ordinary metal salt (e.g. nitrate) is heat treated in a conventional process, high temperature reduction is necessary to alloy platinum with a fire-resistant oxide formed by the heat treatment so that the crystal growth (decrease of surface area) may occur prior to the alloying of the platinum. On the other hand, by the procedure of this invention, the metal salt can easy be reduced at a relatively low temperature it the minimum decrease of the surface area. After impure metals in the metal salts are removed by extraction and dried if necessary, the metal salts are reduced in hydrogen for example at 250° C. for 30 minutes and then the metals reduced are alloyed at an elevated temperature e.g. 7000° C.

In the case of preparing the ternary catalyst containing the platinum, the amount of the metal salts of the organic acid amines is so adjusted that 90 to 40 atomic % of the platinum and each of 5 to 30 atomic % of the second and third metals, most preferably 50 atomic % of the platinum and each 25 atomic % of the second and third metals are contained in the catalyst.

Then, as described earlier, the carburizing of the alloyed catalyst metals supported on the carbon supports is carried out. The procedures of the carburizing themselves may be carried out according to these of a conventional method. The carbon supports are treated at 650° to 815° C. for a required period of tie employing, for example, water vapor, carbon monoxide methane (or other low molecular hydrocarbons), carbon dioxide and the like so that the catalyst metals are carburized or carbonized by carbon produced by dehydrogenation or deoxidation of the carbon monoxide, the lower hydrocarbons, carbon dioxide and the like.

It is possible to prepare the platinum catalyst of the present invention not only by the above preparing process but also by one of the other appropriate processes which comprises directly adhering the platinum particles and the like which have already been carburized, onto the carbon supports.

Each catalyst metal supported on the carbon supports acquires affinity for the carbon by this carburizing and can be supported relatively strongly on the carbon supports. Even if the catalyst is used at a relatively high temperature, the catalyst metal does not move on the carbon supports because the bond between the carbon supports and the catalyst metals are strong, so that the lowering of the catalyst performance is assuredly prevented because the agglomeration due to the movement of the catalyst metals is prevented to depress the decrease of the surface area.

The catalyst according to the present invention may be prepared not only by the above preparing process in which the platinum is adhered before the other metals are adhered but also by the process in which the platinum is adhered after the other metals are adhered, which follow the carburizing.

It is unnecessary to carburize all the catalyst metals, and about 30% of the carburizing is sufficient to depress the decrease of the surface area to a considerable extent. The carbon produced during the carburizing may exist on the carbon supports, on the catalyst metals and between them.

According to the present invention, when a plurality of the catalyst metals including the platinum are supported on the carbon supports, all or part of the catalyst metals are carburized. Each carburized catalyst metal combines with the carbon of the supports with the strong affinity so that the movement of the catalyst metals on the surface of the supports can be depressed.

In other words, the decrease of the catalyst activity due to the decrease of the surface area which occurs when each active site moves to agglomerate can be advantageously prevented because each catalyst metal is fixed on its position on the carbon supports. Appropriate selection of the platinum and the other metals which are to be supported on the carbon supports can provide the platinum containing catalyst especially for a fuel cell which has the required activity and selectivity and a long life.

The present invention will now be described in detail in connection with the following Examples. However these Examples are not intended to limit the scope of the present invention.

EXAMPLE 1

1 g of chloroplatinic acid as dissolved in 300 ml of water in a vessel of which a volume as 0.5 ml. 10 ml out of 75 ml of a solution in which 3 g of $Na_2S_2O_3 5H_2O$ was dissolved as added dropwise into the above solution for 3 minutes and the rest of 65 ml as added all at once, and the solution was stirred at 27° C. With the lapse of time, the mixed solution became from yellow to orange, further to dark orange.

After the lapse of 3 hours, the room as darkened and the light of an electric bulb as applied to the vessel then the scatter of the light was observed. On the other hand, 10 g of Acetylene Black to be employed as a catalyst support as suspended in 100 ml of pure water to prepare a well-suspended slurry which as then added to the above mixed solution. The solution as stirred for two minutes with a supersonic agitator so that the mixed solution as forced to penetrate into the pores of the supports. The slurry as kept to be suspended and did not precipitate during the stirring operation.

The slurry was dried in an oven at 75° to 80° C. overnight for removing water. The dry powders thus obtained were washed three times with about 200 ml of distilled water so that the byproducts were extracted and removed. This slurry was further dried overnight at 70° C. to obtain the carbon supports supported with the platinum.

The average platinum size of the platinum-carbon catalyst thus obtained was 18 Å by X-ray diffraction, and the platinum particles were observed using a transmission electron microscope to have a nearly uniform particle size. The specific surface area was 155 $m^2g$ and the amount of the supported platinum was 10 weight % according to an electrochemical hydrogen adsorption-desorption method.

Then, to 100 ml of a nickel formate aqueous solution (1.54 mmol) was added an ammonium hydroxide aqueous solution until the pH of the solution reached 10, and the solution was stirred at 50° C. for 5 minutes. To the aqueous solution of the nickel salt of formamide was added 3 g of the above platinum-carbon catalyst, and the solution was stirred at 50° C. for 10 minutes.

Thereafter, the slurry obtained as dried at 65° C. by evaporation. After the nickel salt was reduced to nickel reducing the slurry in 10% of a hydrogen flow (the remainder as nitrogen) of which a flow rate was l/minute at 250° C. for 30 minutes, the temperature of the atmosphere of the catalyst as raised to 900° C. so that the platinum and the nickel were alloyed with each other (average particle size of the aHoy as 28 Å).

Then after the carbon supports on which the platinum and the nickel were supported were put into a vessel for carburizing, a 1:1 mixture of nitrogen and methane as supplied into the vessel at a flow rate of 1 l/minute to carburize the metals for about 15 minutes with the inner temperature maintained at 750° to 770° C.

About 3.1 g of the platinum-nickel alloy catalyst was obtained after the content as taken out of the vessel. The supported amount of the platinum and of the nickel in the platinum alloy catalyst were found to be 0.1 g/g-carbon supports and 0.03 g/g-carbon supports (platinum: 50 atomic %, nickel: 50 atomic %), respectively, by measurement employing a chemical analysis method.

The particle size of the platinum-nickel alloy catalyst thus obtained was measured to be 30 Å.

The platinum-nickel alloy catalyst and a tetrafluoroethylene (hereinafter referred to as TFE) dispersion solution were kneaded so that the dispersion containing the platinum-nickel alloy catalyst and TFE in the weight proportion of 6:4 was prepared. The dispersion was applied onto a carbon sheet which had been hydrophobically treated, which was then sintered to provide an electrode of which platinum content was 0.5 mg/cm². After the electrode was incorporated in a half cell of which an electrolyte was 100% phosphoric acid, the cell as used for 72 hours at 1 atm., 190° C. and 200 mA/cm².

Thereafter the catalyst was taken out of the half cell and the particle size of the alloy was again measured to be 34 Å. The air electrode potential (no IR, vs a hydrogen standard electrode) of the half cell as changed from 718 mV to 710 mV.

COMPARATIVE EXAMPLE 1

The platinum-nickel alloy catalyst of Example 1 prior to the carburizing (average particle size of the alloy 28 Å) as incorporated in a half cell of a hot phosphoric acid type fuel cell (Pt: 0.5 mg/cm²) as a cathode (air electrode) and the fuel cell as used for 72 hours at 1 atm., 190° C. and 200 mA/cm². After the catalyst was taken out from the half cell, the particle size of the alloy was again measured to be 37 Å, and the air electrode potential (no IR, vs a hydrogen standard electrode) was changed from 716 mV to 706 mV.

EXAMPLE 2

100 ml of a cobalt acetate aqueous solution (1.54 mmol) was employed in place of the nickel formate aqueous solution in Example 1. An ammonium hydroxide aqueous solution was added to the cobalt acetate solution until the pH of the solution reached 10, to be stirred at 50° C. for 5 minutes. To the aqueous solution of the cobalt salt of the thus formed acetamide was added 3 g of a catalyst supported with only platinum which had been prepared according to the same procedures in Example 1 except that sodium metabisulfite was employed in place of the sodium thiosulfate. The mixture was stirred at 50° C. for 10 minutes.

After the slurry supports which had been prepared similarly to Example 1 as dried and reduced in a hydrogen flow so that the cobalt salt was reduced to cobalt, the temperature of the catalyst atmosphere as raised to 800° C. to alloy the plaitnum with the cobalt (average particle size of the alloy: 29 Å).

Then the platinum and the cobalt on the carbon supports ere carburized in the same conditions as these of Example 1 after the supports were put into the vessel for carburizing.

About 3.1 g of the platinum-cobalt alloy catalyst as obtained after the content as taken out from the vessel. The supported amounts of the platinum and of the cobalt in the catalyst were found to be 0.1 g/g-carbon supports and 0.3 g/g-carbon supports (platinum: 50 atomic %. cobalt: 50 atomic %). respectively.

The particle size of the platinum-cobalt alloy catalyst thus obtained was measured to be 31 Å.

After the platinum-cobalt alloy catalyst was incorporated in a half cell as a cathode (air electrode) of a hot phosphoric acid type fuel cell at a rate of 0.5 mg/cm² of the platinum, the half cell was used at atm., 190° C. and 200 mA/cm² for 72 hours. Thereafter, the catalyst was taken out from the half cell and the particle size of the alloy as measured again to be 34 Å. The air electrode potential (no IR, vs hydrogen standard electrode) of the half cell was changed from 720 mV to 710 mV.

COMPARATIVE EXAMPLE 2

The platinum-cobalt alloy catalyst of Example 2 prior to the carburizing (average particle size of the alloy 29 Å) was incorporated in a half cell of a hot phosphoric acid type fuel cell (Pt: 0.5 m/cm²) as a cathode (air electrode) and the half cell as used for 72 hours at 1 atm., 190° C. and 200 mA/cm². After the catalyst as taken out from the half cell, the particle size of the alloy was again measured to be 37 Å, and the air electrode potential (no IR, vs a hydrogen standard electrode) was changed from 720 mV to 710mV.

EXAMPLES 3 and 4

A platinum-chromium alloy catalyst and a platinum-iron alloy catalyst were prepared employing the same procedures as these of Example 1.

The addition of ammonium hydroxide, the reduction and the alloying were performed as these of Examples 1 and 2 employing chromium acetate (iii) and iron formate as a chromium source and an iron source, respectively, to provide 3.0 g of an uncarburized platinum-chromium alloy catalyst of which an alloy particle size as 28 Å and 3.0 g of an uncarburized platinum-iron alloy catalyst of which an alloy particle size as 25 Å.

These catalysts were carburized in the same conditions as these of Example 1 to provide about 3.1 g of a carburized platinum-chromium alloy catalyst and about 3.1 g of a carburized platinum-iron alloy catalyst.

The supported amounts of the platinum and of the chromium in the platinum-chromium alloy catalyst were measured to be 0.1 g/g-carbon supports and 0.027 g/g-carbon supports (platinum: 50 atomic % and chromium: 50 atomic %), respectively. The supported amounts of the platinum and of the iron in the platinum-iron alloy catalyst were measured to be 0.1 g/g-carbon supports and 0.029 g/g-carbon supports (platinum: 50 atomic % and iron: 50 atomic %). respectively.

The alloy particle sizes of the both catalysts ere measured to be 30 Å for the platinum-chromium alloy catalyst and 28 Å for the platinum-iron alloy catalyst.

The both catalysts were separately incorporated in a half cell of a hot phosphoric acid type fuel cell (Pt: 0.5 mg/cm²) as a cathode (air electrode) and the half cell was used for 72 hours at 1 atm., 190° C. and 200 mA/cm². After the catalysts were taken out from the half cell, the particle sizes of the alloys were again measured to be 33 Å for the platinum-chromium alloy catalyst and 32 Å for the platinum-iron alloy catalyst.

The air electrode potentials (no IR, vs a hydrogen standard electrode) in the half cell were changed from 727 mV to 720 mV for the platinum-chromium alloy catalyst and from 706 mV to 688 mV for the platinum-iron alloy catalyst.

EXAMPLE 5

A mixed solution of 50 ml of a nickel formate aqueous solution (0.77 mmol) and of 50 ml of a cobalt acetate aqueous solution (0.77 mmol) was employed in place of the nickel formate aqueous solution in Example 1. An ammonium hydroxide aqueous solution was added to the above solution until the pH of the solution reached 10, to be stirred at 50° C. for 5 minutes. To the mixed aqueous solution of the nickel salt of the formamide and the cobalt salt of the acetamide was added 3 g of the carbon support catalyst supported with only platinum which had been obtained in Example 1. The mixture was stirred at 50° C. for 10 minutes.

After the slurry which had been prepared similarly to Example 1 was dried and reduced in a hydrogen flow so that the nickel salt and the cobalt salt were reduced to nickel and cobalt, the temperature of the catalyst atmosphere was raised to 900° C. to alloy the platinum with the nickel and the cobalt (average particle size of the alloy: 32 Å).

Then the platinum, the nickel and the cobalt on the carbon supports were carburized in the same conditions as these of Example 1 after the supports were put into the vessel for carburizing.

About 3.1 g of the platinum-nickel-cobalt alloy catalyst was obtained after the content was taken out from the vessel. The supported amounts of the platinum, of the nickel and of the cobalt in the catalyst were found to be 0.1 g/g-carbon supports. 0.015 g/g-carbon supports and 0.015 g/g-carbon supports (platinum: 50 atomic %. nickel: 1 25 atomic % cobalt: 25 atomic %), respectively.

The alloy particle size of the platinum-nickel-cobalt alloy catalyst thus obtained was measured to be 34 Å.

The platinum-nickel-cobalt alloy catalyst was incorporated in a half cell of a hot phosphoric acid type fuel cell (Pt: 0.5 mg/cm$^2$) as a cathode (air electrode) and the half cell was used for 72 hours at 190° C. and 200 mA/cm$^2$. After the catalyst was taken out from the half cell, the particle size of the alloy was again measured to be 36 Å. The air electrode potential (no IR, vs a hydrogen standard electrode) in the half cell was changed from 760 mV to 755 mV.

EXAMPLES 6-8

In place of the nickel formate aqueous solution and the cobalt acetate aqueous solution of Example 5, (i) a chromium (III) acetate aqueous solution (50 ml) and a cobalt acetate aqueous solution (50 ml) were employed (Example 6), or (ii) a chromium (III) acetate aqueous solution (50 ml) and a nickel formate aqueous solution (50 ml) ere employed (Example 7), or (iii) a nickel formate aqueous solution (50 ml) and a manganese formate aqueous solution (50 ml) were employed (Example 8) to prepare uncarburized platinum catalysts consisting of the platinum and the other two metals as Example 5.

The proportions of the metals on the catalysts thus obtained was (i) 50 atomic % of the platinum, 25 atomic % of the chromium and 25 atomic % of the cobalt, (ii) 50 atomic % of the platinum, 25 atomic % of the chromium and 25 atomic % of nickel, and (iii) 50 atomic % of the platinum, 25 atomic % of the nickel and 25 atomic % of the manganese.

The average alloy particle sizes of each catalyst were 30 Å (Example 6, platinum-chromium-cobalt alloy catalyst), 33 Å (Example 7, platinum-chromium-nickel alloy catalyst) and 30 Å (Example 8, platinum-nickel-manganese alloy catalyst.

Then each of these uncarburized platinum alloy catalysts were carburized in the same conditions as those of Example 1 after the catalysts were put into a vessel for carburizing. The alloy particle sizes of the carburized platinum alloy catalysts thus obtained were 33 Å (Example 6), 35 Å (Example 7) and 31 Å (Example 8).

The carburized catalysts thus obtained were incorporated in a half cell of a hot phosphoric acid type fuel cell (Pt: 0.5 mg/cm$^2$) as a cathode (air electrode) and the half cell was used for 72 hours at 1 atm., 190° C. and 200 mA/cm$^2$. After the catalysts were taken out from the half cell, the particle sizes of the alloys were again measured to be 35 Å (Example 6), 37 Å (Example 7) and from 32 Å (Example 8).

The air electrode potentials (no IR, vs a hydrogen standard electrode) in the half cell were changed from 735 mV to 730 mV (Example 6), from 743 mV to 735 mV (Example 7) and from 740 mV to 736 mV.

COMPARATIVE EXAMPLES 3 to 8

The platinum alloy catalysts of Examples 3 to 8 which were in the states prior to the carburizing were separately incorporated in a half cell of a hot phosphoric acid type fuel cell (Pt: 0.5 mg/cm$^2$) as a cathode (air electrode) in accordance with the procedures of Examples 1 and 2 (Comparative Examples 3 to 8). After the half cells were used for 72 hours, the catalysts were taken out of the half cells.

The alloy particle sizes of each of the platinum alloy catalysts were measured to be 37 Å (Comparative Example 3), 35 Å (Comparative Example 4), 37 Å (Comparative Example 5), 38 Å (Comparative Example 6), 39 Å (Comparative Example 7) and 40 Å (Comparative Example 8).

The air electrode potentials (no IR, vs a hydrogen standard electrode) of each of the half cell were changed from 725 mV to 712 mV (Comparative Example 3), from 707 mV to 682 mV (Comparative Example 4), from 758 mV to 752 mV (Comparative Example 5), from 735 mV to 725 mV (Comparative Example 6), from 743 mV to 730 mV (Comparative Example 7) and from 740 mV to 717 mV (Comparative Example 8).

The results of the above Examples 1 to 8 and Comparative Examples 1 to 8 can be summarized in the following Table.

While the invention has been particularly set forth in terms of the specific embodiments thereof, it will be understood in view of the instant disclosure that numerous variations upon the invention are now enabled to those skilled in the art, which variations yet reside within the scope of the present teaching. Accordingly, the invention is to be broadly construed, and limited only by the scope and spirit of the claims appended hereto.

TABLE

Alley Particle Size Change and Potential Change of Each Catalyst

| | Average Particle Size of Alloy Particle (Å) | | Potential (mV) | |
|---|---|---|---|---|
| | At Beginning | At Completion | At Beginning | At Completion |
| EXAMPLE | | | | |
| 1 | 30 | 34 | 718 | 710 |
| 2 | 31 | 34 | 720 | 713 |
| 3 | 30 | 33 | 727 | 720 |
| 4 | 28 | 32 | 706 | 688 |
| 5 | 34 | 36 | 760 | 755 |
| 6 | 33 | 35 | 735 | 730 |
| 7 | 35 | 37 | 743 | 735 |
| 8 | 31 | 32 | 740 | 736 |
| COMP. EX. | | | | |
| 1 | 28 | 37 | 716 | 706 |
| 2 | 29 | 37 | 720 | 710 |
| 3 | 28 | 37 | 725 | 712 |
| 4 | 25 | 35 | 707 | 682 |
| 5 | 32 | 37 | 758 | 752 |
| 6 | 30 | 38 | 735 | 725 |
| 7 | 33 | 39 | 743 | 730 |
| 8 | 30 | 40 | 740 | 717 |

What is claimed is:

1. A process for preparing a platinum catalyst comprising a carbon support and the at least partially carburized alloy of (i) platinum and of (ii) one or more metals selected from the group consisting of nickel, cobalt, chromium and iron, supported on the carbon support, comprising:

immersing the carbon support into a solution containing a platinum containing ion;

reducing the platinum containing ion to platinum by a reducing agent to be deposited onto the carbon support;

adding a solution containing the organic acid amine salt or salts of one or more metals selected from the group consisting of nickel, cobalt, chromium and iron, to the carbon support;

reducing the said salt or salts to the corresponding selected metals by low temperature treatment under reducing conditions to minimize crystal growth; and alloying catalytically active quantities of said platinum and said one or more selected metals; and at least partially carburizing the resulting alloy by carbon produced by high temperature treatment with carbon monoxide, carbon dioxide or lower hydrocarbons.

2. A process as defined in claim 1, wherein the reducing agent is a thiosulfate and/or a metabisulfite.

3. A process as defined in claim 1, wherein the organic acid amine salt is a formamide salt and/or an acetamide salt.

4. A method in accordance with claim 1, wherein at least 30% of said alloy is carburized.

5. A process for preparing a platinum catalyst comprising a carbon support and the at least partially carburized alloy of (i) platinum, of (ii) one or more metals selected from the group consisting of nickel, cobalt, chromium and iron, and of (iii) manganese supported on the carbon support, comprising immersing the carbon supports into a solution containing a platinum containing ion;

reducing the platinum containing ion to platinum by a reducing agent to be deposited onto the carbon support;

adding a solution containing the organic acid amine salt or salts of one or more metals selected from the group consisting of nickel, cobalt, chromium and iron, and the organic acid amine salt of manganese, to the carbon support;

reducing the said salt or salts to the corresponding selected metals by low temperature treatment under reducing conditions to minimize crystal growth;

alloying catalytically active quantities of said platinum and said one or more selected metals; and at least partially carburizing the resulting alloy by carbon produced by high temperature treatment with carbon monoxide, carbon dioxide or lower hydrocarbons.

6. A process as defined in claim 5, wherein the reducing agent is a thiosulfate and/or a metabisulfite.

7. A process as defined in claim 5, wherein the organic acid amine salt is a formamide salt and/or an acetamide salt.

8. A method in accordance with claim 5, wherein at least 30% of said alloy is carburized.

* * * * *